May 7, 1940.   F. SHENTON   2,199,761
SHAFT SEAL
Filed Oct. 23, 1937
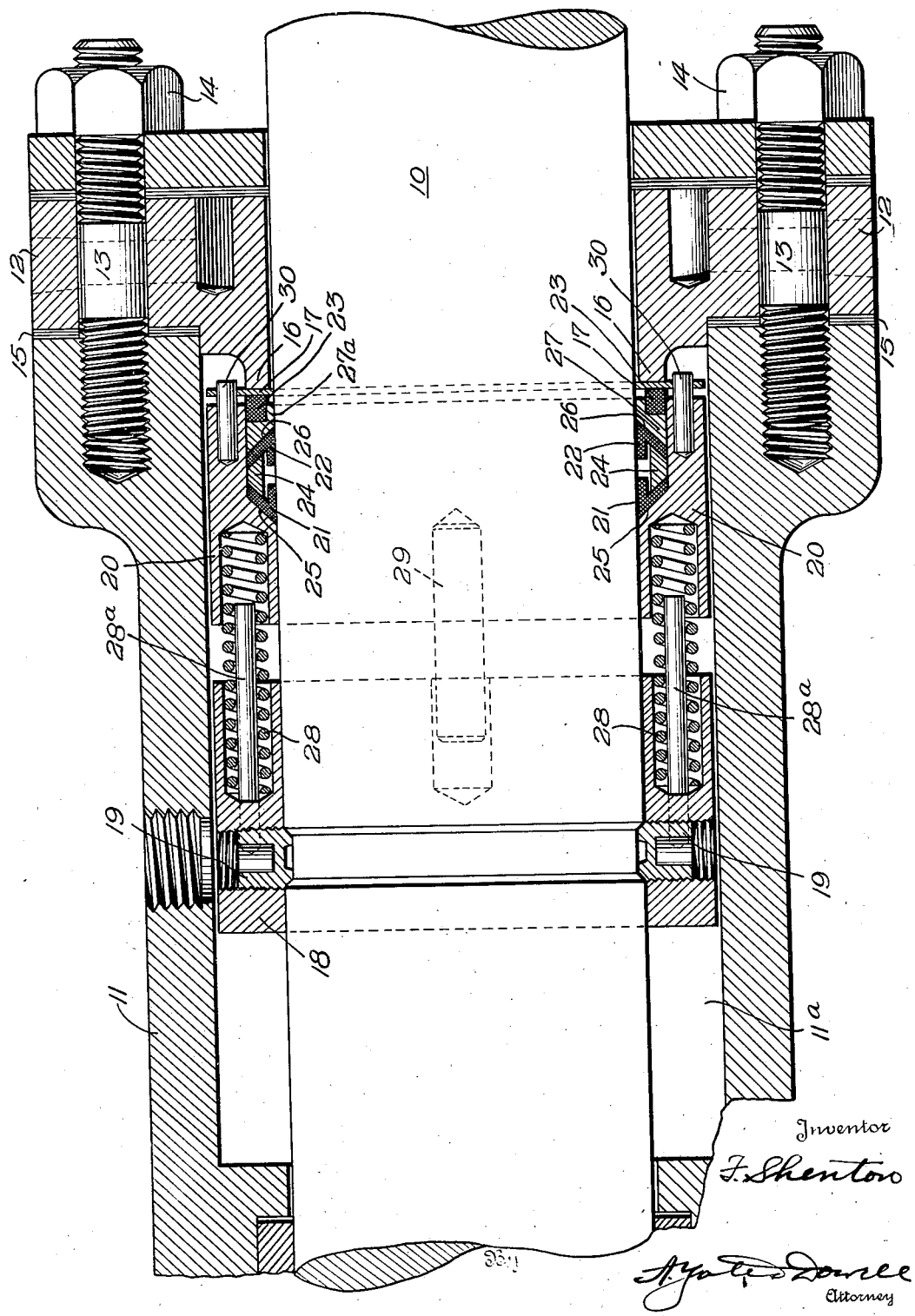
Inventor
F. Shenton
Attorney Patented May 7, 1940

2,199,761

UNITED STATES PATENT OFFICE 2,199,761

SHAFT SEAL

Francis Shenton, Waynesboro, Pa., assignor to Frick Company, Waynesboro, Pa., a corporation of Pennsylvania Application October 23, 1937, Serial No. 170,683

5 Claims. (Cl. 286—7)

This invention relates to refrigeration and more particularly to the provision of a pressure-tight seal around a rotating shaft where it passes through a wall, as for example, the wall of a crankcase or the like to prevent leakage of refrigerant fluid through the wall along the shaft by means of which power is supplied for driving the compressor.

The present invention may be considered in the nature of an improvement on, or as an alternative construction with respect to that disclosed by my Patent No. 2,020,436, granted November 12, 1935. While the shaft seal covered by the patent just specified is, in general, highly satisfactory, yet certain difficulties were encountered in its use when installed in a system where the gas pressure in the crankcase fluctuated above and below atmospheric pressure. When the fluid pressure in the crankcase exceeds outside or atmospheric pressure, a force is exerted on the crankshaft tending to push it out of the crankcase or against the thrust bearing forming part of the shaft seal assembly. The magnitude of this force is equal to the difference in these two pressures (fluid and atmospheric) times the cross sectional area of the shaft where it passes through the shaft seal. When the pressure in the crankcase is less than the external pressure, this force reverses its direction, tending to push the shaft further into the crankcase.

It is customary to build compressors and the like with some endwise movement allowed to the crankshaft so as to permit expansion and contraction of the shaft due to changes in temperature. Further, wear of thrust bearings eventually results in end play. The shaft seal as covered by Patent No. 2,020,436 did not as a rule slide easily enough on the shaft due to binding of the compressible packing ring against the shaft, and when the pressure in the crankcase changed from higher to lower than outside pressure and the crankshaft moved further into the crankcase, the sealing faces sometimes separated and permitted leakage.

Generally stated, therefore, the object of the present invention is to provide a shaft seal adapted for use in a refrigerating system which effectively seals the joint around a rotating shaft. More specifically, the invention contemplates a seal of the type specified which will operate effectively regardless of stresses resulting from fluctuation of crankcase pressures above and below outside or atmospheric pressures.

Another object is to provide a shaft seal assembly which while embodying the advantageous features of the seal disclosed in my patent above noted, has the added advantage in that the sealing members more effectively resist separation from their coacting sealing surfaces due to stresses resulting from fluctuation in crankcase pressures.

The foregoing and other objects and advantages will become apparent in view of the following description taken in conjunction with the drawing, wherein:

The single figure is a substantially central longitudinal sectional view of a shaft seal assembly illustrating one application of the invention.

Referring to the drawing in detail, a shaft is indicated at 10, said shaft extending through the wall 11 of the housing or crankcase of a compressor or the like (not shown) of a refrigerating system and by means of which power is supplied for driving the compressor or other mechanism.

The wall 11 is provided with an enlarged bore 11a around the shaft 10 to accommodate the seal mechanism, such enlarged bore being formed either in the wall or in an extension thereof.

A sealing flange 12 is attached to the cylindrical extension of the wall 11 by means of bolts or studs 13 and nuts 14, the joint being made pressure-tight by means of a gasket 15. The sealing flange 12 is provided with a relatively thin neck 16 having its end surface ground and in intimate contact with a flexible sealing and bearing or wear ring 17 mounted to rotate with the shaft 10 and be forced against the ground face of the thin neck 16 of the sealing flange 12. An inner or rear spring-retaining ring 18 is fastened solidly to the shaft 10 by set screws 19 or in any other suitable manner.

An outer or front spring-retaining ring 20 is disposed around shaft 10 in spaced relation to the ring 18 and is provided with an annular channel in which are located packing rings 21, 22 and 23 of any suitable compressible flexible material adapted for such purposes.

The packing rings 21 and 22 are preferably substantially V-shaped and are maintained in position and spaced from one another by a spacer ring 24, conical surface 25 of front retaining ring 20 and conical surface 26 of ring 27. The rings 21, 22 and 23 may be made of suitable resilient material such as synthetic rubber known as "Neoprene", composition rubber or analogous material.

Ring 27 fits into the outer end of the annular channel in front retaining ring 20 and has its outer surface machined down to form an annular space or recess between front retaining ring 20 and ring 27 to receive packing ring 23. It will be noted that this ring 23 (which compares with ring 21 of Patent No. 2,020,436) at no time contacts with or exerts a binding action on shaft 10, since the flange portion 27a of ring 27 spaces the said packing ring from the shaft, or maintains it free of binding engagement with the latter.

Springs 28 are interposed between the back retaining ring 18 and the front retaining ring 20 with their opposite ends projecting into bores or pockets formed in the rings 18 and 20. Guide pins 28a are provided for the springs 28.

Rotation of the front retaining ring 20 with the shaft 10 is assured by means of driving pins 29 engaging front and rear retaining rings 18 and 20. In like manner the sealing ring 17 is caused to positively rotate with the shaft 10 by means of suitable means such as dowel pins 30 seated in the front spring-retaining ring 20 and extending through apertures in the ring 17. In place of dowel pins and like positive connecting means, friction between the parts may be depended upon for establishing such connection. Thus while a positive connection is preferred, it is not essential to the operation of the invention.

In operation, shaft 10 rotates within the stationary portion of the housing and carries with it front and rear retaining rings 18 and 20, springs 28, flexible disc 17, packing rings 21, 22 and 23, and rings 24 and 27. Sealing flange 12 is stationary with the housing 11, and the wearing surfaces are between the ground face 16 of the sealing flange and the flexible disc 17. The annular space around the shaft 10 within the wall 11 will be filled with fluid at a pressure above or below atmospheric, the leakage of which into or out of the casing this invention is designed to prevent.

The springs 28 force the flexible disc 17 against the face 16 with sufficient pressure to prevent fluid leakage therebetween. Also, packing ring 23 is compressed against the disc 17 to prevent leakage at that point. Packing rings 21 and 22 hug the shaft 10 and prevent leakage along the shaft and thence between the disc 17 and the shaft 10. Due to the substantial V-shape of the packing rings 21 and 22, fluid pressure tends to collapse them against the shaft so as to assure a tight joint. When, however, the pressures inside and outside the crankcase are equal or a substantially balanced condition exists, there is no tendency to collapse the packing rings 21 and 22 against the shaft, and these rings, therefore, do not hug the shaft tight enough to offer severe frictional resistance to end-wise movement of the shaft. Therefore, as the pressure in the crankcase changes from above to below outside pressure, which is coincident with the end-wise movement of the shaft into the crankcase due to this change in pressure, the thrust of the springs 28 is free to counteract the frictional thrust of the shaft on the retaining ring 20 and hold the disc 17 against the seal face 16 so that the seal will prevent leakage in spite of end-wise shaft movement.

The present invention is particularly suited for sealing a joint around a shaft of relatively large diameter and having a high rotational speed.

It will be obvious to those skilled in the art that various changes may be made in my device without departing from the spirit of the invention. It will also be obvious that while the improved seal assembly is primarily adapted for use in refrigeration systems, it may be used to equal advantage in systems subject to similar or analogous conditions, or systems wherein the gas pressure in an enclosed housing through which the shaft to be sealed extends is subject to fluctuations above and below atmospheric or outside pressure. I do not therefore limit myself to what is shown in the drawing and described in the specification but only as indicated in the appended claims.

What is claimed is:

1. A fluid pressure seal for the joint between a shaft and a relatively stationary member through which the shaft extends, one of which is provided with an annular bearing face and the other having a metallic sealing and bearing ring surrounding said shaft and rotatable therewith and engaging said bearing face to seal against leakage of fluid radially of the shaft, a compressible packing ring engaging said sealing and bearing ring, and a coacting seal for sealing against leakage of fluid axially of the shaft comprising additional compressible packing rings surrounding said shaft and having tapered edge sealing portions presented in opposed relation axially of and lying contiguous to said shaft whereby fluid pressures exerted longitudinally of the shaft tend to compress said portions against the shaft, and mechanical means urging said additional compressible packing rings against said shaft and said first named compressible packing ring against said sealing and bearing ring.

2. A fluid pressure seal for the joint between a shaft and a stationary member through which the shaft extends, one of which is provided with an annular bearing face and the other having a sealing and bearing ring surrounding said shaft and rotatable therewith and engaging said bearing face to seal against leakage of fluid radially of the shaft, a compressible packing ring engaging said sealing and bearing ring, and a coacting seal for sealing against leakage of fluid axially of the shaft comprising additional compressible packing rings surrounding said shaft within cooperative adjacency to said first named packing ring and having substantially angle-shaped outer edge sealing portions presented in opposed relation axially of and lying contiguous to said shaft whereby fluid pressures exerted longitudinally of the shaft tend to compress said portions against the shaft, and a spring pressed member sleeved on and rotatable with the shaft for maintaining all of said compressible packing rings in compressed condition and urging said sealing and bearing ring into sealing engagement with said annular bearing face.

3. A fluid pressure seal for the joint between a shaft and a stationary member through which the shaft extends, one of which is provided with an annular bearing face, comprising a metallic sealing and bearing ring surrounding said shaft and engaging said annular bearing face, a compressible packing ring engaging said sealing and bearing ring, additional packing means surrounding said shaft in rear of said first named packing ring, said additional packing means having axially opposed substantially angle shaped edge sealing portions contiguous to said shaft whereby fluid pressures exerted longitudinally of said shaft tend to bind said portions to the shaft, means spacing said first named packing ring from the shaft, and means mechanically urging said additional packing rings in fluid-tight relation with said shaft, said means also operating to urge said first-named packing ring against the sealing and bearing ring and the latter against said bearing face.

4. A seal for the joint between a shaft and a stationary member through which the shaft extends, one of which is provided with an annular bearing face, comprising a flexible metallic sealing and bearing ring surrounding said shaft and engaging said annular bearing face, a compressible packing ring engaging the inner face of said sealing and bearing ring, a pair of coacting spaced compressible packing rings surrounding said shaft in rear of said first-named packing ring and having axially opposed substantially angle shaped outer edge sealing portions lying contiguous to said shaft, means spacing said first-named packing ring from the shaft and also from said second-named packing rings, and means mechanically urging said coacting rings in fluid tight relation with said shaft, said means also operating to urge said first-named packing ring against the sealing and bearing ring and the latter against said bearing face.

5. A seal for the joint between a shaft and a stationary member through which the shaft extends, one of which is provided with an annular bearing face, comprising a flexible metallic sealing and bearing ring surrounding said shaft and engaging said annular bearing face, a compressible packing ring engaging the inner face of said sealing and bearing ring, a pair of additional packing rings coacting with one another and surrounding said shaft in rear of said first-named packing rings, a ring spacing said additional packing rings, said additional packing rings and spacer ring having as a unit a substantially V-shaped contour in cross section with axially opposed angle-shaped sealing portions lying contiguous to said shaft, another spacer ring spacing said first named packing ring from said shaft and also from said additional packing rings, and spring-pressed means in rear of all of said packing rings maintaining them in compressed condition and urging said sealing and bearing ring against said bearing face.

FRANCIS SHENTON.